(12) United States Patent
Valyukh et al.

(10) Patent No.: US 8,471,999 B2
(45) Date of Patent: Jun. 25, 2013

(54) LOW VOLTAGE LIQUID CRYSTAL LENS WITH VARIABLE FOCAL LENGTH

(75) Inventors: Sergiy Valyukh, Borlange (SE); Vladimir Grigorievich Chigrinov, Hong Kong (CN); Hoi Sing Kwok, Hong Kong (CN)

(73) Assignee: The Hong Kong University of Science and Technology, Hong Kong (CN)

( * ) Notice: Subject to any disclaimer, the term of this patent is extended or adjusted under 35 U.S.C. 154(b) by 265 days.

(21) Appl. No.: 12/988,790

(22) PCT Filed: Apr. 20, 2009

(86) PCT No.: PCT/US2009/041075
§ 371 (c)(1),
(2), (4) Date: Oct. 20, 2010

(87) PCT Pub. No.: WO2009/131925
PCT Pub. Date: Oct. 29, 2009

(65) Prior Publication Data
US 2011/0043717 A1    Feb. 24, 2011

Related U.S. Application Data

(60) Provisional application No. 61/071,358, filed on Apr. 24, 2008.

(51) Int. Cl.
*G02F 1/13* (2006.01)
(52) U.S. Cl.
USPC ............................. 349/200; 349/33; 349/129
(58) Field of Classification Search
USPC ............... 349/123, 126, 132, 33, 200, 95, 86, 349/88, 178, 110, 129, 127, 158, 113, 114, 349/13, 187
See application file for complete search history.

(56) References Cited

U.S. PATENT DOCUMENTS

| 4,190,330 A | 2/1980 | Berreman |
| 5,389,698 A * | 2/1995 | Chigrinov et al. ................. 522/2 |
| 5,540,997 A | 7/1996 | Perettie et al. |
| 5,712,721 A | 1/1998 | Large |
| 5,909,265 A * | 6/1999 | Kim et al. ..................... 349/129 |
| 6,061,043 A | 5/2000 | Bonnett et al. |

(Continued)

FOREIGN PATENT DOCUMENTS
JP    2004/226974 A    8/2004

OTHER PUBLICATIONS

Berreman, "Solid Surface Shape and the Alignment of an Adjacent Nematic Liquid crystal," Phys. Rev. Lett., 28: 1683-1686 (1972).

(Continued)

*Primary Examiner* — Thoi Duong
(74) *Attorney, Agent, or Firm* — Leydig, Voit & Mayer, Ltd.

(57) ABSTRACT

Disclosed herein is a liquid crystal lens with a variable focal length. The gradient profile of the liquid crystals molecules that causes the gradient profile of the refractive index is achieved by inducing non-uniformly distributed anchoring energy and an external electric or magnetic field applied to the liquid crystal layer. Unlike existing electrically controlled liquid crystal lens, the external electric or magnetic field has a uniform spatial distribution within the liquid crystal layer. The focal length of the liquid crystal lens is controlled via the non-uniformly distributed anchoring energy and by varying the uniformly distributed electric or magnetic field.

21 Claims, 8 Drawing Sheets

U.S. PATENT DOCUMENTS

| | | | |
|---|---|---|---|
| 6,191,881 | B1 | 2/2001 | Tajima |
| 6,778,246 | B2 | 8/2004 | Sun et al. |
| 6,859,333 | B1 | 2/2005 | Ren et al. |
| 6,927,823 | B1 | 8/2005 | Reznikov et al. |
| 7,019,890 | B2 | 3/2006 | Meredith et al. |
| 7,060,332 | B2 | 6/2006 | Kwon et al. |
| 7,079,203 | B1 * | 7/2006 | Huang et al. .................. 349/95 |
| 7,307,683 | B2 | 12/2007 | Nomura et al. |
| 7,362,387 | B2 * | 4/2008 | Jung et al. ..................... 349/2 |
| 7,375,784 | B2 | 5/2008 | Smith et al. |
| 7,388,822 | B2 * | 6/2008 | Ooi et al. ................ 369/112.02 |
| 2002/0027624 | A1 * | 3/2002 | Seiberle ........................ 349/73 |
| 2004/0125294 | A1 | 7/2004 | Angele et al. |
| 2005/0074616 | A1 * | 4/2005 | Harchanko et al. ........... 428/413 |
| 2005/0264751 | A1 | 12/2005 | Goto |
| 2006/0001810 | A1 | 1/2006 | Park |
| 2006/0274296 | A1 | 12/2006 | Tolbert et al. |
| 2007/0146853 | A1 | 6/2007 | Singer et al. |
| 2007/0273812 | A1 | 11/2007 | Bone et al. |

OTHER PUBLICATIONS

Cho et al., "Photo-induced liquid crystal alignment on imide oligomer containing cinnamate group," Materials Science and Engineering: C, 24 (1-2): 195-199 (2004).

Marrucci et al., "Pancharatnam-Berry phase optical elements for wavefront shaping in the visible domain: switchable helical modes generation," Appl. Phys Lett., 88: 221102 (2006).

Ren et al., "Adaptive liquid crystal lens with large focal length tunability," Optics Express, 14 (23): 11292-11298 (Nov. 13, 2006).

U.S. Patent & Trademark Office, International Search Report in International Patent Application No. PCT/US2009/041075 (Jun. 10, 2009).

U.S. Patent & Trademark Office, Written Opinion of the International Searching Authority in International Patent Application No. PCT/US2009/041075 (Jun. 10, 2009).

Ye et al., "Liquid crystal lens prepared utilizing patterned molecular orientations on cell walls," Appl. Phys. Lett., 89: 141112 (2006).

Thieghi et al., "Manipulation of anchoring strength in an azo-dye side chain polymer by photoisomerization," Physical Review E 67, 041701, Apr. 7, 2003, American Physical Society, College Park, Maryland.

Chigrinov et al., "Photoaligning: Physics and Applications in Liquid Crystal Devices," 2008, Wiley, Hoboken, New Jersey.

Fion et al., "Liquid Crystal Alignment Layer With Controllable Anchoring Energies," Journal of Display Technology, Mar. 2008, vol. 4, No. 1, Institute of Electrical and Electronics Engineers, New York, New York.

* cited by examiner

LOW VOLTAGE LIQUID CRYSTAL LENS
WITH VARIABLE FOCAL LENGTH

CROSS-REFERENCE TO RELATED
APPLICATIONS

This patent application claims the benefit of U.S. Provisional Patent Application No. 61/071,358, filed Apr. 24, 2008, which is hereby incorporated by reference in its entirety.

BACKGROUND OF THE INVENTION

The present invention relates to lenses with variable focal length in general. More precisely, it relates to liquid crystal lenses wherein the gradient profile of liquid crystal molecules acts as an optical lens for incoming light.

The ability to quickly change the focal length of lenses by means of electronic control may be necessary in systems in which it is difficult to integrate bulky optical systems or mechanics for adjusting such systems mechanically. Liquid crystal lenses with an electronically controlled focal length can allow for rapid electronic variation of the lens focal length without requiring the mechanical manipulation of the optical path.

Existing techniques for controlling the focal length of liquid crystal optical devices rely on non-uniform distributions of the external electric or magnetic field for varying the refractive index of the liquid crystal layer. Such systems often include an electrode in contact with the liquid crystal layer to provide the electric or magnetic field to the optical lens system. In order to create non-uniform distributions of the external field, these systems require specific electrode patterns and a significant number of components. These complex electrode structures and bulky electronic components are difficult to integrate service and maintain. Therefore, it is desired to have a liquid crystal optical device having a simple system structure for highly integrated applications.

BRIEF SUMMARY OF THE INVENTION

Described herein is a liquid crystal optical device with a variable focal length and a method for manufacturing such a device. The novel device finds application in micro-lens systems for optical equipment and, particularly, in adaptive optics, optoelectronics, machine vision, stereo display and eyeglass applications.

The nature of liquid crystal (liquid crystal) alignment by profile was first introduced by Dwight. W. Berreman in 1972 in "Solid Surface Shape and the Alignment of an Adjacent Nematic Liquid crystal," Physical Review Letter, vol. 28, pp. 1683-1686, 1972. In this article, Berreman described possible alignment conditions for liquid crystals and derived equations in accordance with these conditions.

U.S. Pat. No. 6,191,881 describes a variable focal length lens panel including a circular transparent electrode on a first substrate at the center, a plurality of annular transparent electrodes which are disposed outside the circular transparent electrode concentrically and narrowed in width and interval as they are directed outward, extension electrodes which extend crosswise outward from the center to an external terminal electrode, and an alignment layer on these electrodes. The device further includes a transparent electrode on an entire surface of a second substrate, and an alignment layer on the transparent electrode. The first substrate and the second substrate are bonded to each other while keeping a given internal by gap members disposed outside the annular transparent electrodes, and a nematic liquid crystal is sealed in a gap between the first substrate and the second substrate.

U.S. Pat. No. 6,778,246 describes a liquid crystal adaptive lens including a reference plate, a liquid crystal layer in electric communication with the reference plate, and a plurality of closed-loop electrodes in electric communication with the liquid crystal layer. The closed-loop electrodes receive a variable control voltage such that the refractive index of the liquid crystal layer is adjustable.

U.S. Pat. No. 6,859,333 describes an adaptive optical lens having a planar substrate with a spherical or annular ring-shaped Fresnel grooved transparent electrode. The device includes another planar substrate having a transparent electrode coated on its inner surface. When a voltage is applied across the liquid crystal layer, a centro-symmetrical gradient distribution of refractive index within liquid crystal layer will occur. By controlling the applied voltage, the focal length of the lens is continuously tunable.

U.S. Pat. No. 7,019,890 describes a lens including an electro-active cell to provide a lens having two focal lengths. The electro-active cell is capable of adjusting the focal length based on voltages applied to the electro-active cell. The voltage is supplied by an alternating current source, including a flying capacitor circuit.

According to one embodiment of the current invention, a liquid crystal optical device having a variable focal length comprises at least one liquid crystal layer residing between first and second substrates, at least one of the first and second substrates having an alignment layer, wherein the alignment layer exhibits anchoring energy having a non-uniform spatial distribution.

According to a further embodiment, the alignment layer includes a material with a photo-induced alignment property, and the non-uniform spatial distribution of the anchoring energy is induced by at least one of a non-uniform illumination, a non-uniform polarization, and a non-uniform thickness of the alignment layer. Alternatively, the non-uniform spatial distribution of the anchoring energy is induced by a non-uniform rubbing applied to the alignment layer. Alternatively, the alignment layer comprises different materials and the non-uniform spatial distribution of the anchoring energy is induced by spatially varying the concentrations of the different materials.

According to another embodiment, a method is provided for controlling a variable focal length of a liquid crystal optical device, comprising (i) applying at least one of a voltage and a magnetic field to a liquid crystal layer residing between the first and the second substrates, wherein at least one of the first and the second substrates includes an alignment layer having anchoring energy with a non-uniform spatial distribution within the alignment layer, and (ii) varying at least one of the voltage and the magnetic field for controlling the variable focal length. A magnetic field can be applied for liquid crystal reorientation, if applied in a perpendicular direction to the initial liquid crystal director. Alternatively, the magnetic field can be applied for the stabilization of liquid crystal alignment, especially in case of a very low polar anchoring energy, if applied parallel to the initial liquid crystal director.

According to a further embodiment, the voltage and/or magnetic field has a uniform spatial distribution within the liquid crystal layer.

BRIEF DESCRIPTION OF THE SEVERAL
VIEWS OF THE DRAWINGS

DETAILED DESCRIPTION OF THE INVENTION

Described herein is an electro-optic lens having a variable focal length. According to one embodiment of the invention, the electro-optic lens is filled with liquid crystal material and controlled by an external electric or magnetic field. The orientation of liquid crystal molecules depends not only on the external electric or magnetic field applied to the liquid crystal layer, but also on the elastic, dielectric (if a electric field is applied) or magnetic (if a magnetic field is applied) properties of the liquid crystal and on the anchoring energy of an alignment layer. The liquid crystal lens has non-uniform surface conditions between the liquid crystal layer and the alignment layer of the lens. In particular, the alignment layer has a non-uniform spatial distribution of anchoring energy induced by various methods described herein.

The liquid crystal anchoring energy must be the highest at the center of the cell to have a positive lens effect, while for a negative lens it should be the highest at the edges of the cell, if the initial liquid crystal alignment is homogeneous (parallel to the plates) and the liquid crystal dielectric anisotropy is positive. The liquid crystal anchoring energy must be the highest at the edges of the cell to have a positive lens effect, while for a negative lens it should be the highest at the center of the cell, if the initial liquid crystal alignment is homeotropic (perpendicular to the plates) and the dielectric anisotropy is negative. The focal distance and the diameter of the lens are determined by the liquid crystal cell thickness, optical birefringence and the range of the anchoring energy variation. A microlens with a diameter of 1 mm and an optical power of 18 dioptres can be obtained with the spatial distribution of the anchoring energy from $5 \times 10^{-6}$ J/m$^2$ to $3 \times 10^{-4}$ J/m$^2$.

According to a further embodiment, a gradient profile of the anchoring energy results in a gradient profile of the orientations of the liquid crystal molecules. This, in turn, leads to a gradient profile of the refractive index for an extraordinary light wave passing through the liquid crystal so that the liquid crystal device acts as an optical lens. Furthermore, the magnitude of the gradient profile of the liquid crystal molecules may be continuously controlled by using an external electric or magnetic field. As a result, the magnitude of the refractive index gradient profile and therefore the focal length of the liquid crystal lens can be controlled accordingly. According to another embodiment of the invention, a non-uniform distribution of the anchoring energy causes a gradient profile of the molecular orientation and the refractive index, even when the external electric or magnetic field is uniformly distributed and the liquid crystal layer has a uniform thickness.

Figure 1:
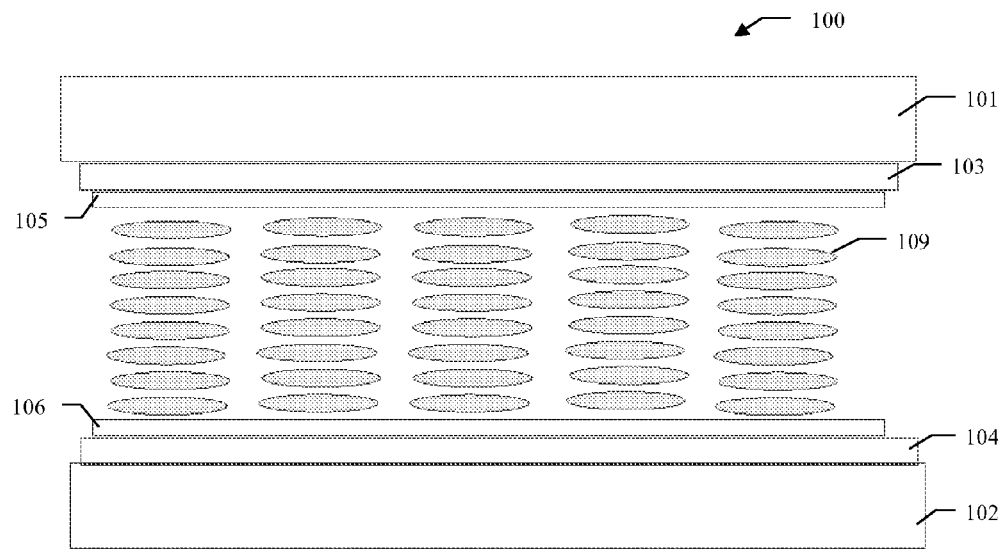
FIG. 1 is a schematic cross-sectional side view of a liquid crystal optical device in keeping with an embodiment of the invention.

FIG. 1 depicts a schematic cross-sectional side view of a liquid crystal lens 100 according to one embodiment of the invention, wherein liquid crystal material 109 is sandwiched between two substrates (i.e., an upper substrate 101 and a lower substrate 102).

Substrates 101 and 102 may be chosen from any material, such as quartz, glass, or plastic, having favourable optical transmission properties as well known in the art. In addition, substrates 101 and 102 may have thereon a specific electrode pattern for applying the external electric or magnetic field to the liquid crystal layer 109. For example, substrates 101 and 102 may comprise a uniform electrode or an electrode having a grid pattern, concentric circles, or other suitable electrode patterns.

As depicted in FIG. 1, the substrates 101 and 102 further include conductive inner layers 103 and 104, respectively. The conductive material used for the conductive layers 103 and 104 can be any suitable material, including those specifically described herein, and other conductive materials known in the art. According to one embodiment, the conductive layers 103 and 104 are of a transparent material such as indium oxide, tin oxide, and indium tin oxide (ITO). Accordingly another embodiment, for a reflective device, one of the conductive layers 103 and 104 may be transparent, and the other one reflective, so that a substantial portion of incident light waves are reflected. Alternatively, one of the conductive layer 103 and 104 may be partially transparent, and the other one partially reflective, so that the incident light waves are partially refracted and partially reflected. Furthermore, the thickness of the conductive layers 103 and 104 is typically between 30 nm and 200 nm. These conducting layers must be thick enough to provide adequate conduction, but it is preferred the layers not be too thick as to significantly increase the overall thickness of the lens structure.

The alignment layers 105 and 106 comprise material possessing anisotropic volume or anisotropic surface properties so as to align molecules near the surface of the liquid crystal material 109. Exemplary materials include polyimide or a polymer with photoinduced anisotropy. As noted above, the alignment layers 105 and 106 set the orientation of molecules near the surfaces of the liquid crystal material 109. The interaction of molecules of liquid crystal material 109 with either one of the alignment layers 105 and 106 is characterized by the anchoring energy of the alignment layers 105 and 106. According to a further embodiment, at least one of the alignment layers 105 and 106 has anchoring energy with a non-uniform spatial distribution. Such non-uniform distribution of the anchoring energy causes variations of the orientation of liquid crystal molecules, and therefore results in a spatial variation of the refractive properties of the liquid crystal material 109, as required for lens behaviour.

In an embodiment of the invention, the substrates 101 and 102 are kept at a desired separation via spacers (not shown in the figure), or other separation means. The spacers may be of any suitable material, e.g., glass, quartz, Mylar, or other rigid or flexible material that provides spacing and electric isolation. According to another embodiment, only one alignment layer is used for interacting with the liquid crystal material 109 in the liquid crystal device. In this embodiment, either of the alignment layers 104 and 105 may be omitted from liquid crystal device 100, with the liquid crystal device 100 still being able to provide similar function, albeit potentially at a reduced level.

According to one embodiment, the molecules of liquid crystal material 109 are reoriented under the influence of an applied electric or magnetic field (not shown in the figure). Nematic liquid crystals are uniaxial, and the optical axis is coincident with the molecular axis. As the molecules reorient in the presence of an electric or magnetic field, the entire indicatrix is rotated, thus creating large changes in the index of refraction. According to a further embodiment, the applied external electric or magnetic field has a uniform spatial distribution within the liquid crystal material 109. It is not required to spatially vary the external electric or magnetic field in order to control the refractive index of the liquid crystal device 100. Since there is no need to spatially vary the applied field, unlike existing systems, the liquid crystal device 100 is able to use much simpler electrical control circuits and/or electrode structures.

In general, liquid crystals usable within embodiments of the invention can be divided into two categories. In one embodiment, the dielectric tensor is such that the component along the molecular axis (also the optical axis) is greater than the component perpendicular to the axis ($\epsilon_{II} > \epsilon_\perp$). In this embodiment, the liquid crystal has positive dielectric anisotropy and the molecules tend to align parallel to the external field applied to the liquid crystal. Alternatively, the dielectric tensor is such that the component along the molecular axis (also the optical axis) is greater than the component perpendicular to the axis ($\epsilon_{II} > \epsilon_\perp$). In this embodiment, the liquid crystal possesses negative dielectric anisotropy and the molecules tend to align perpendicular to the external field. In either embodiment, the orientation of a molecule of liquid crystal material 109 depends on the external electric or magnetic field, the anchoring energy of the alignment layer, the position of the molecule in the cell, and the elastic properties of the liquid crystal material 109.

Unlike existing methods for fabricating liquid crystal lens using alignment layers with a uniform distribution of the anchoring energy and a non-uniform distribution of the external electric field, a new method is described herein. The new method is usable for fabrication of a liquid crystal lens wherein a gradient profile of molecules of liquid crystal material 109 is induced by a non-uniform distribution of the anchoring energy and an applied electric or magnetic field having a uniform spatial distribution. According to one embodiment, the non-uniform spatial distribution of the anchoring energy in the alignment layer 105 and 106 is induced by using a photo-aligning technology that employs polymers with photo-induced anisotropy. The anchoring energy of the polymer is established by illumination during the photo-polymerization. A non-uniform distribution of the illuminating light results in a non-uniform distribution of the anchoring energy. According to an alternative embodiment, non-uniform distribution of the anchoring energy is induced by utilizing a rubbing technology. Rubbing a surface, such as the surface of a polyimide, can form anisotropy on the surface that in turn causes molecular alignment in the liquid crystal material 109. In this embodiment, anchoring energy depends on the parameters of the rubbing, i.e., force, material, speed, etc. In another embodiment, the non-uniform conditions of the rubbing cause a non-uniform distribution of the anchoring energy of the alignment layer.

Alternatively, a non-uniform distribution of the liquid crystal anchoring energy can be achieved by several other methods. For example, it can be achieved by varying the exposure time of the photoalignment layer in a scanned point-by-point fashion. It can be achieved by varying the exposure energy of the photoalignment layer that is exposed through a gray-level mask.

In addition a non-uniform distribution of the liquid crystal anchoring energy can be achieved exposing the alignment layer through photo-masks producing a controllable modification of a polarization and/or intensity of a transmitted light. A light pattern of non-uniform polarization and/or intensity may be formed by utilizing a polarization-controlling mask including a liquid crystal spatial light modulator. In particular, a spatial light modulator may control the light polarization, the light intensity or both at every point independently on a photo-alignment layer. Alternatively, the non-uniform polarization and/or the light transmission at points on a photo-alignment layer may be controlled at each point sequentially by utilizing a polarizer and/or intensity modulator and a scanning light beam to form the desired exposure light pattern.

According to one embodiment, the non-uniform distribution of the anchoring energy can be achieved by varying the thickness of the photoalignment layer. In this embodiment, a photoresist having an easily controllable thickness made by photolithography can be used. Specifically, the polymer PVCN or PVMC (a PVCN derivative) is a classical photoresist material and at the same time a photoalignment material. A pure Indium Titanium Oxide material has a high polar anchoring energy, but it can be screened by PVMC layer with a low anchoring energy. The screening thickness will define the resulting value of the anchoring energy. A continuous variation of the PVMC thickness can be made by continuously extracting the sample from the developing solution or spin coating.

According to another embodiment, the non-uniform distribution of the anchoring energy can also be achieved by using various photoalignment materials in a multilayer structure and at the same time vary the thickness of each constituent material. Alternatively, it can be achieved by applying the Indium Titanium Oxide layer or other current conducting layer having a varying roughness. The various photoalignment materials are known to have very different polar anchoring energies, starting from $10^{-7}$-$10^{-5}$ J/m$^2$ for the PVCN polymer and surfactants up to $5.10^{-4}$ J/m$^2$ for sulfonic azo-dye SD1.

According to still another embodiment, the anchoring energy varies with the material properties of the alignment layers 105 and 106. The alignment layers 105 and 106 in this embodiment each comprise at least two materials having different anchoring energies. Accordingly, the spatial distribution of the concentrations of these materials creates a varying spatial distribution of anchoring energy. For example, the concentrations of the at least two different materials may be varied by using a screen printing process or a diffusion process. Alternatively, the non-uniform distribution of anchoring energy can be created by employing an ink-jet printing technique on the alignment layers 105 and 106. In particular, ink jet printing technique can modify a thickness of the photo-alignment layer in various parts of the cell by controlling the size or the distribution of the droplets. Alternatively, an alignment layer may be applied by screen printing different materials according to a half-tone process or an ink jet method to obtain a layer containing a spatially varying average areal density of different materials, and then the microscopic distribution of the materials may be made smooth by causing or allowing the materials to diffuse over a distance approximately twice the droplet spacing.

Due to the non-uniform distribution of the anchoring energy of the alignment layers 105 and 106, the refractive index of the liquid crystal material 109 is modified in a spatially non-uniform manner according to the reorientation of the liquid crystal molecules. As a light wave is transmitted through the liquid crystal lens 100, the liquid crystal material 109 induces additional phase differences in the incident light wave. The liquid crystal lens 100 can exhibit a positive focal length (converging) or a negative focal length (diverging), depending on the distribution of refractive index within the liquid crystal material 109 as controlled by anchoring energy and an electric or magnetic field. The focal length of the liquid crystal lens 100 may be calculated using the following formula, $$f = \frac{\pi r^2}{\Delta \Phi \lambda},$$

where f is the focal length, r is the lens radius, $\Delta \Phi$ is the phase difference between two extraordinary waves passed through the center and periphery of the liquid crystal lens, and $\lambda$ is the wavelength of the incident light wave.

In an embodiment of the invention, the liquid crystal lens 100 is combined with a static lens or optical system having optical power $D_o$. In this embodiment, assuming the liquid crystal lens 100 can be varied from a minimum value $D_{min}$ to a maximum value $D_{max}$, the combined optical system exhibits a shifted range of between $D_o+D_{min}$ and $D_o+D_{max}$. One way of making a static lens in combination with the liquid crystal lens 100 is to employ curved substrates 101 and 102 in making the lens. In an embodiment, the combined optical system will exhibit an optical power $D_o+D_{min}$ when the external electric or magnetic field is zero.

EXAMPLE 1

Figure 2:
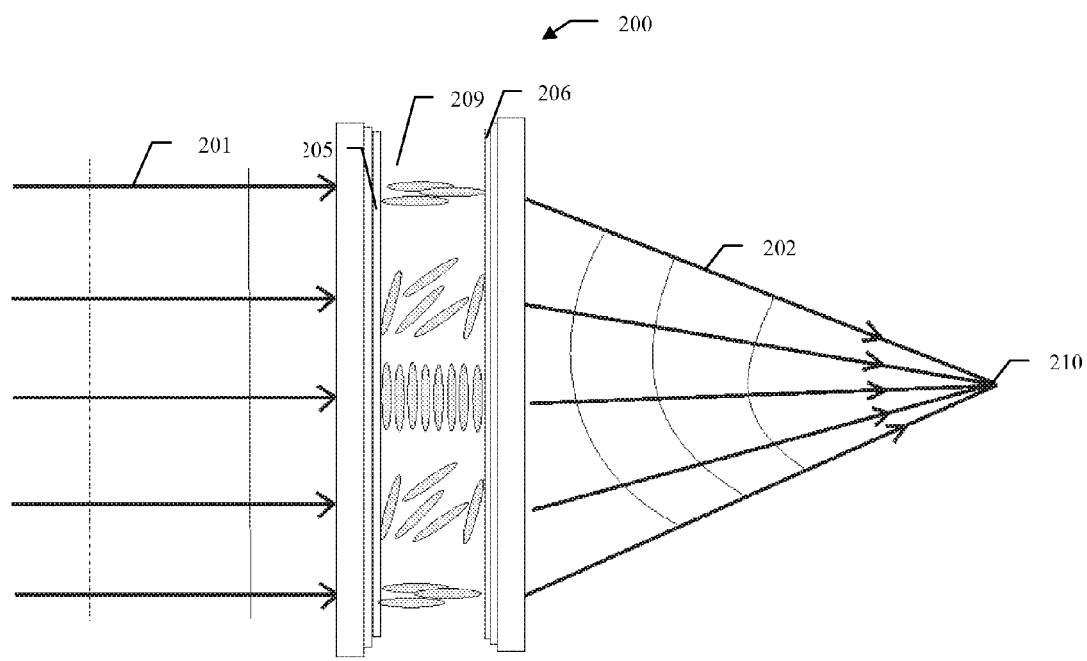
FIG. 2 is a schematic cross-sectional side view of liquid crystal optical device in keeping with another embodiment of the invention wherein the crystal optical device has a positive focal length.

FIG. 2 illustrates a schematic diagram of a positive liquid crystal lens 200 and a light wave propagating through it. The gradient profile of molecules of liquid crystal material 209 is formed by utilizing a uniform electric or magnetic field and alignment layers 205 and 206 having anchoring energy with a non-uniform spatial distribution. In this case, the non-uniform distribution of the anchoring energy causes the liquid crystal lens 200 to possess a positive focal length and thus provides a converging effect to the incident light wave. As shown in FIG. 2, the incident planar wavefront 201 of the light wave entering the liquid crystal device 200 is modified by the refractive index gradient in the liquid crystal material 209, producing an outgoing wavefront 202 which is a spherical wavefront converging to point 210. Similarly, a spherical wavefront 202 incident on the liquid crystal material is modified by the refractive index gradient in the liquid crystal material 209 to produce a planar outgoing wavefront 201. Consequently, an incident planar wavefront 201 may be transformed by the liquid crystal lens 200 to an outgoing spherical wavefront 202, and vice versa, due to the positive focal length.

Figure 4:
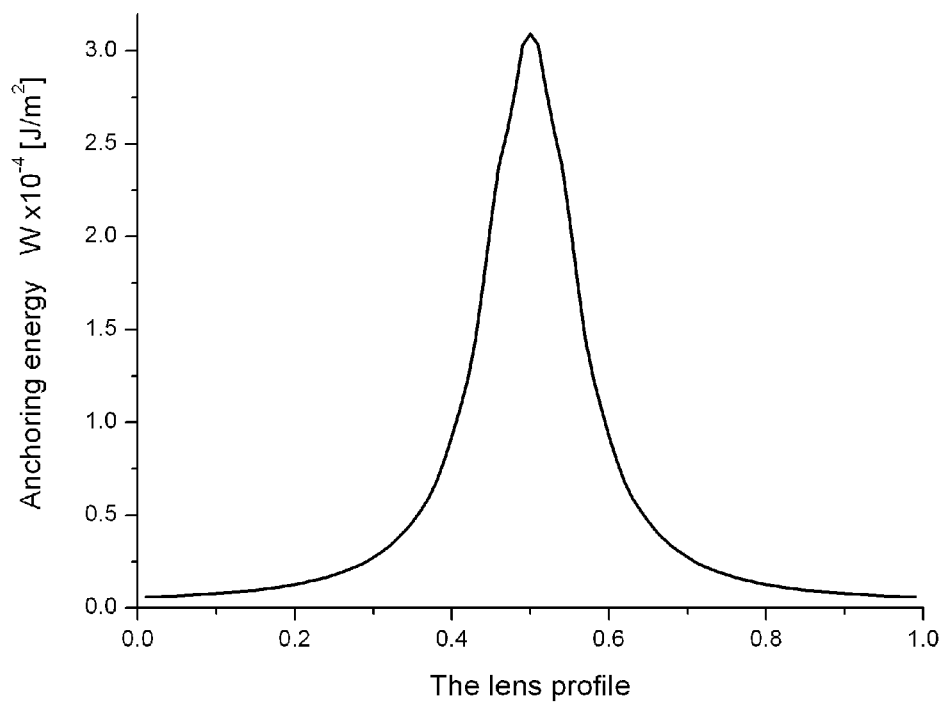
FIG. 4 depicts a non-uniform distribution of the anchoring energy as a function of the liquid crystal lens profile in liquid crystal device 200.

FIG. 4 is an illustration of the calculated spatial distribution of the anchoring energy of alignment layers 205 and 206 as a function of the lens profile for creating the gradient profile of the liquid crystal molecules in the positive lens 200 shown in FIG. 2. The external voltage applied to conductive surfaces 203 and 204 controls the magnitude of the gradient profile and, as a result, controls the focal length of the liquid crystal lens 200.

Figure 6:
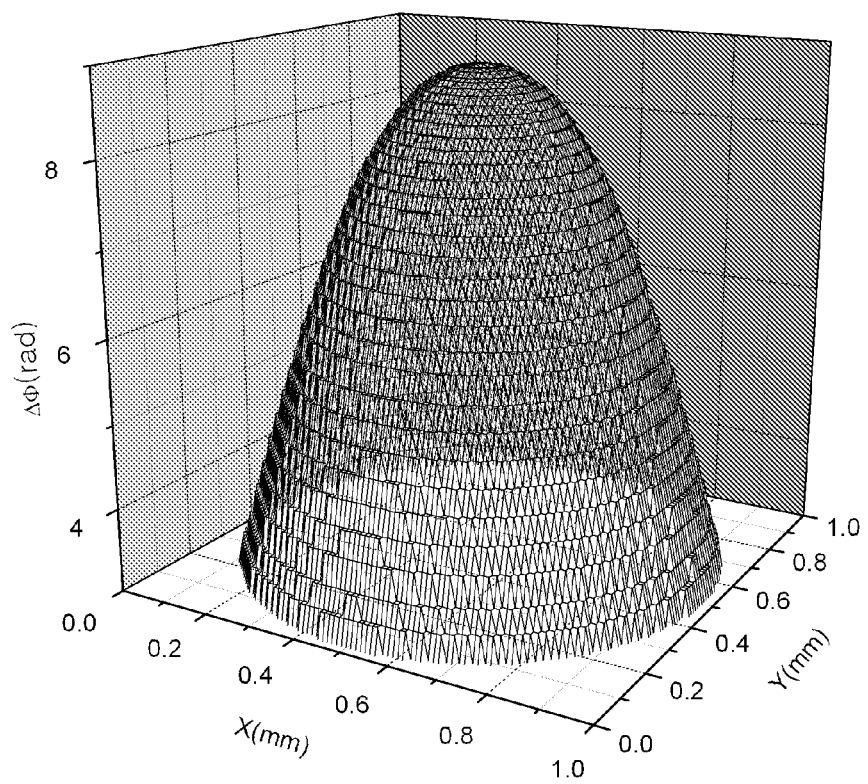
FIG. 6 illustrates the calculated phase profile of light waves that pass through liquid crystal lens 200 when the applied voltage is set to 0.35 V.

FIG. 6 shows the calculated phase profile of a light wave that has passed through the liquid crystal lens shown in FIG. 2 when the value of the applied voltage is 0.35 V. The calculations are based on liquid crystal material E7 from Merck, assuming the thickness of the liquid crystal material 209 is 15 μm and the lens diameter is 1.0 mm.

Figure 7:
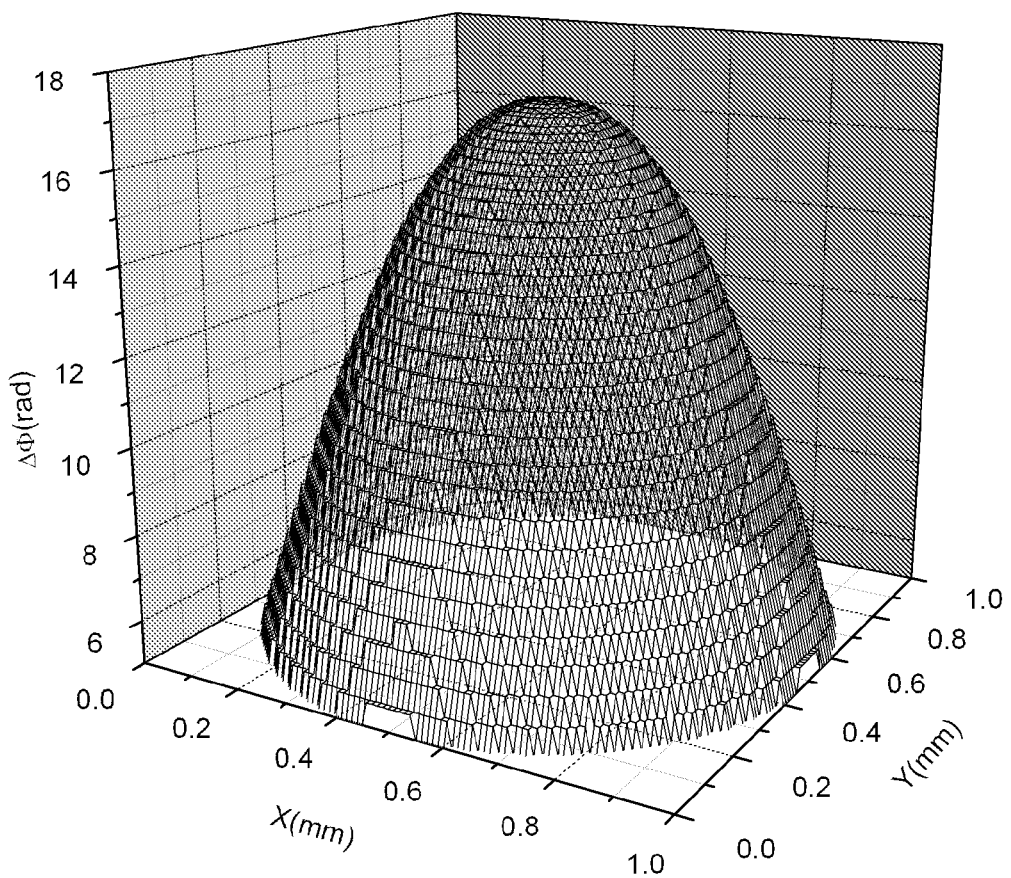
FIG. 7 illustrates another calculated phase profile of light waves that pass though liquid crystal lens 200 when the applied voltage is set to 0.75 V.

FIG. 7 shows the calculated phase profile of a light wave that has passed through the liquid crystal lens shown in FIG. 2 when the value of the applied voltage is 0.75 V. The calculation is based on liquid crystal material E7 from Merck, assuming the thickness of the liquid crystal material 209 is 15 μm and the lens diameter is 1.0 mm.

Figure 8:
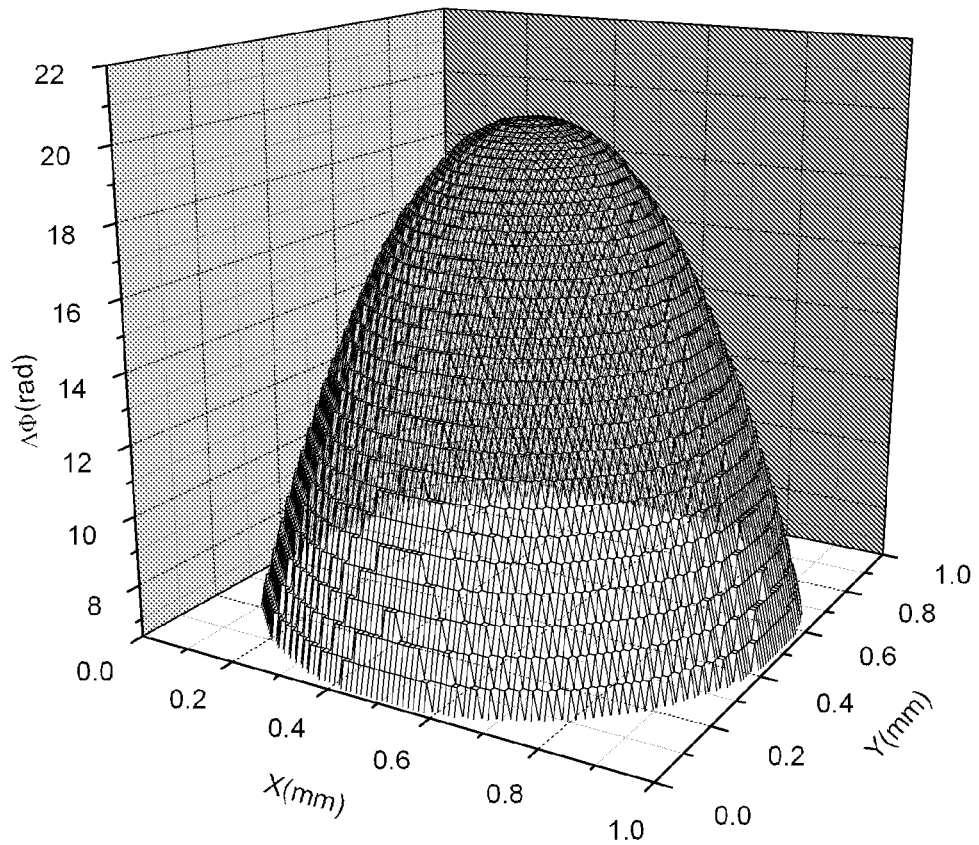
FIG. 8 illustrates still another calculated phase profile of light waves that pass through liquid crystal lens 200 when the applied voltage is set to 1.0 V.

FIG. 8 shows the calculated phase profile of the light wave passed through the liquid crystal lens shown in FIG. 2 when the value of the applied voltage is 1.0 V. The calculation is based on liquid crystal material E7 from Merck, assuming the thickness of the liquid crystal material 209 is 15 μm and the lens diameter is 1.0 mm. As illustrated in FIGS. 6, 7, and 8, the liquid crystal lens 200 induces larger phase differences at the center than at the edge of the lens 200. Due to the non-distribution of the anchoring energy imposed to the liquid crystal layer 209 by the alignment layers 205 and 206, the focal length can be controlled by a uniform electric or magnetic field.

EXAMPLE 2

Figure 3:
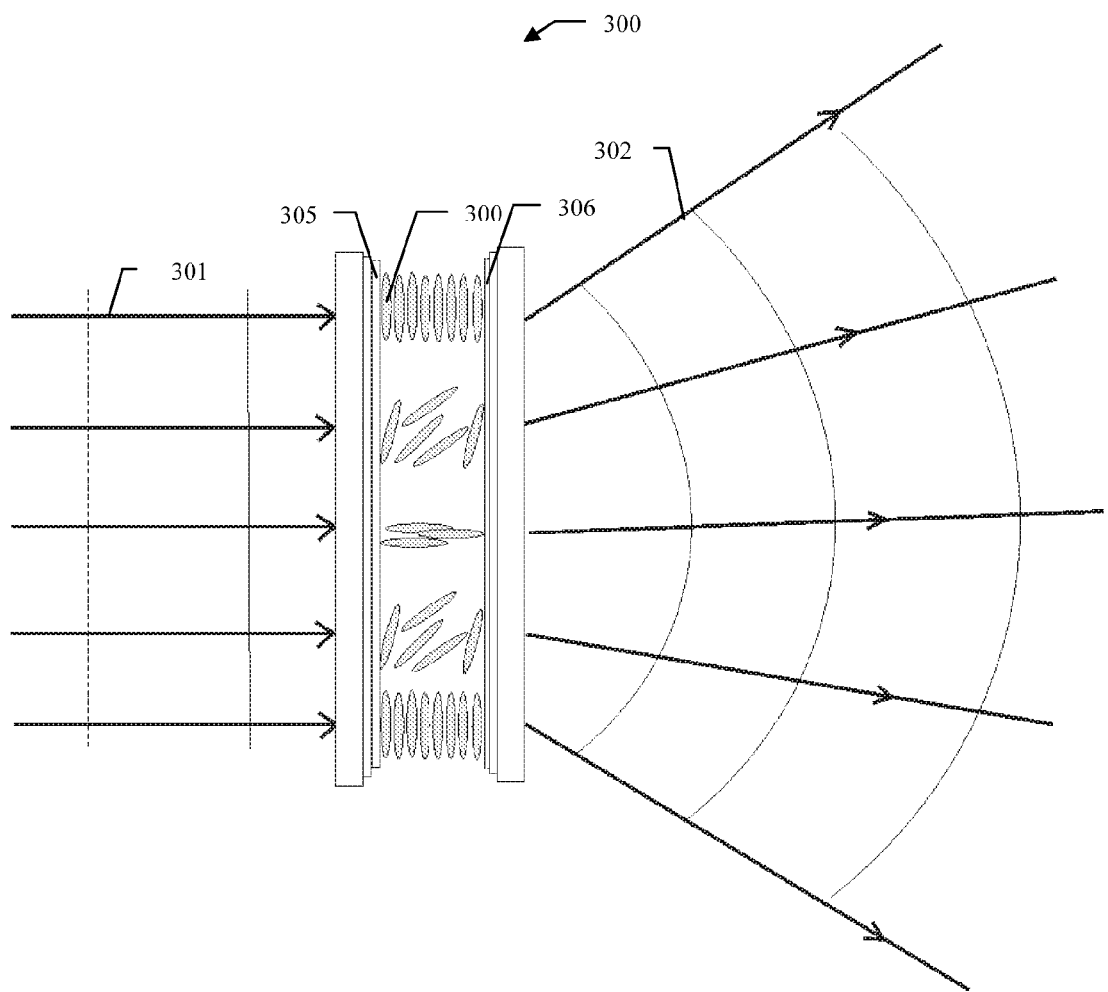
FIG. 3 is a schematic cross-sectional side view of liquid crystal optical device in keeping with another embodiment of the invention wherein the crystal optical device has a negative focal length.

FIG. 3 is a schematic diagram of a liquid crystal lens 300 with a negative focal length and a light wave propagating through it. As with the liquid crystal lens 200, the gradient profile of molecules of liquid crystal material 309 is formed by utilizing a uniform electric or magnetic field with alignment layers 105 and 106 that have a non-uniform spatial distribution of anchoring energy. In the liquid crystal lens 300 shown in FIG. 3, the non-uniform distribution of the anchoring energy causes the liquid crystal lens 300 to possess a negative focal length and thus have a diverging effect on an incident light wave.

As further shown in FIG. 3, the incident planar wavefront 301 of the light wave entering the liquid crystal device 300 is modified by the refractive index gradient in the liquid crystal material 309, producing spherical outgoing wavefront 302. On the other hand, a spherical wavefront 202 incident on the liquid crystal lens 300 is modified by the refractive index gradient of liquid crystal material 309 to produce outgoing wavefront 301 which is planar. Consequently, incident planar wavefront 301 may be transformed by the liquid crystal lens 300 to outgoing spherical wavefront 302, and vice versa, due to the positive focal length.

Figure 5:
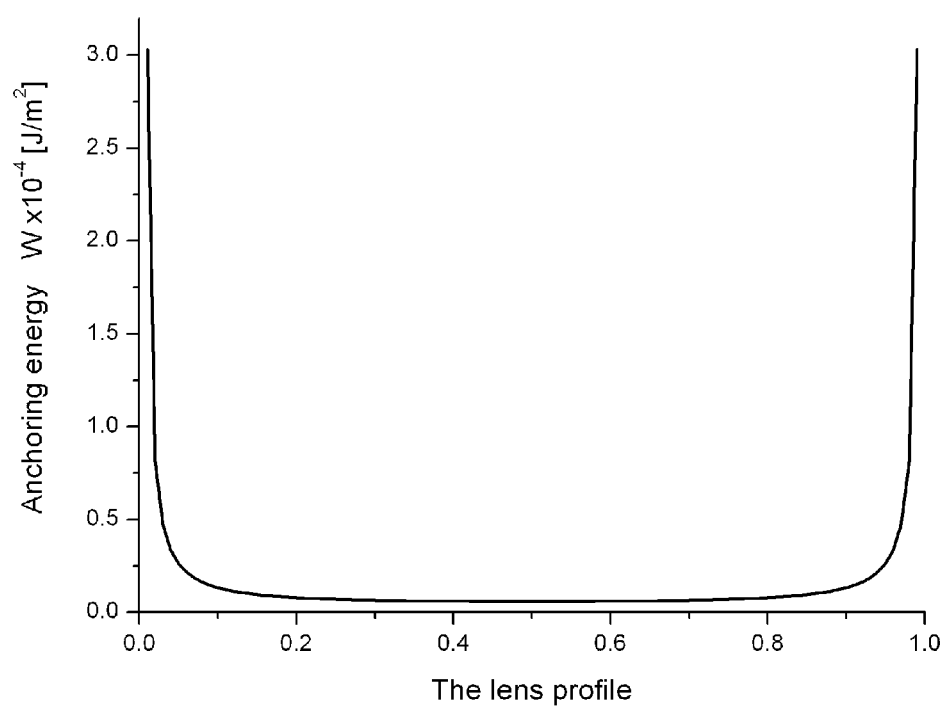
FIG. 5 depicts another non-uniform distribution of the anchoring energy as a function of another liquid crystal lens profile in liquid crystal device 300.

FIG. 5 is an illustration of the calculated spatial distribution of the anchoring energy of alignment layers 305 and 306 as a function of the lens profile for creating the gradient profile of the liquid crystal molecules in the negative liquid crystal lens 300 shown in FIG. 3. The uniformly distributed voltage applied to conductive surfaces 303 and 304 controls the magnitude of the gradient profile and, as a result, the focal length of the liquid crystal lens 300.

EXAMPLE 3

Figure 9:
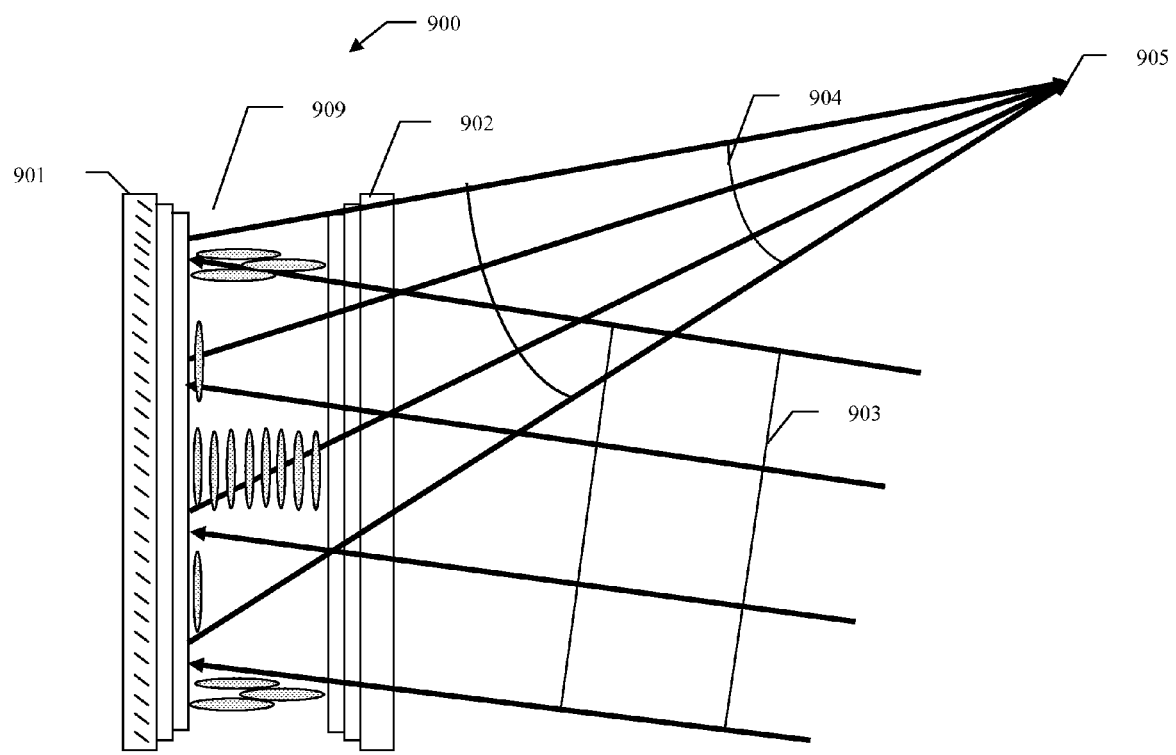
FIG. 9 is a schematic cross-sectional side view of liquid crystal optical device in keeping with another embodiment of the invention the liquid crystal optical device has a reflective substrate for reflecting incident light waves.

Depicted in FIG. 9 is a schematic diagram of another liquid crystal lens 900 having a substrate 901 coated with a material that reflects light waves. As shown in FIG. 9, the liquid crystal lens 900 acts as a reflective lens or as a concave or convex mirror. The optical power of reflective lens 900 is double that of a transparent lens such as liquid crystal lens 200 and liquid crystal lens 300. As incident light wave 903 having a planar wavefront passes through substrate 902 and liquid crystal layer 909, the liquid crystal layer 909 induces a phase difference to the incident light wave and therefore produces outgoing light wave 904 having a spherical wavefront. As illustrated in FIG. 9, liquid crystal lens 900 has a positive focal length; thereby causing the reflected light wave 904 to converge at point 905.

Furthermore, in liquid crystal lens 900, the light passes through liquid crystal material 909 two times. Therefore, the illustrated arrangement of liquid crystal lens 900 doubles the optical power of the lens and the range over which the optical power can be varied by applying an electric or magnetic field, relative to a transmissive arrangement.

The independence of the liquid crystal lens with respect to polarization can be achieved by stacking liquid crystal cells together in such a way that the planes of the liquid crystal director variation are perpendicular to each other. Stacking multiple liquid crystal lenses can increase optical power without decreasing the speed of the focal length variation, which is defined by the response of the slowest liquid crystal cell used in the configuration.

It will be appreciated that a new system for controlling the focal length of a liquid crystal lens and a method for manufacturing a liquid crystal lens with a variable focal length have been described and enabled herein. All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A liquid crystal optical device having a variable focal length, comprising:
at least one liquid crystal layer residing between a first substrate and a second substrate;
at least one alignment layer configured to align liquid crystals of the at least one liquid crystal layer, the at least one alignment layer having anchoring energy that is spatially non-uniform, wherein the anchoring energy increases radially outwards from the center of the liquid crystal optical device to the edges of the liquid crystal optical device or decreases radially outwards from the center of the liquid crystal optical device to the edges of the liquid crystal optical device; and
wherein the liquid crystals of the at least one liquid crystal layer are configured to provide a positive or negative lens effect to light passing through the at least one liquid crystal layer in the presence of an applied uniform electric or magnetic field; and
wherein focal length corresponding to the positive or negative lens effect is controllable based on magnitude of the applied uniform electric or magnetic field.

2. The liquid crystal optical device according to claim 1, wherein the at least one liquid crystal layer, the first and the second substrates, and the at least one alignment layer are transparent.

3. The liquid crystal optical device according to claim 1, wherein one of the first and the second substrates has a reflective surface facing the at least one liquid crystal layer.

4. The liquid crystal optical device according to claim 1, wherein at least one of the first and the second substrates is a flexible substrate or a glass substrate.

5. The liquid crystal optical device according to claim 1, wherein at least one of the first and second substrates has an electrode pattern thereon.

6. The liquid crystal optical device according to claim 1, wherein the at least one alignment layer includes a material with a photo-induced alignment property, and the spatially non-uniform distribution of anchoring energy is induced by at least one of a non-uniform illumination, a non-uniform polarization, and a non-uniform thickness of the alignment layer.

7. The liquid crystal optical device according to claim 1, wherein the spatially non-uniform distribution of anchoring energy is induced by a non-uniform rubbing applied to the alignment layer.

8. The liquid crystal optical device according to claim 1, wherein the at least one alignment layer comprises multiple distinct materials and the non-uniform spatial distribution of the anchoring energy is induced by spatially varying the concentrations of the multiple distinct materials.

9. The liquid crystal optical device according to claim 1, wherein the non-uniform distribution of the anchoring energy of the at least one alignment layer is induced by an ink-jet printing process, wherein a size of a droplet is a continuously varied corresponding to a change of a thickness of the at least one alignment layer.

10. The liquid crystal optical device according to claim 1, wherein at least one of the first and the second substrates has a flat surface.

11. The liquid crystal optical device according to claim 1, wherein at least one of the first and the second substrates has a curved surface.

12. A method for controlling a variable focal length of a liquid crystal optical device, comprising:
applying at least one of a uniform electric field and a uniform magnetic field to a liquid crystal layer residing between a first substrate and a second substrate to provide a positive or negative lens effect to light passing through the liquid crystal layer, the liquid crystal layer being associated with at least one alignment layer configured to align liquid crystals of the liquid crystal layer the at least one alignment layer having anchoring energy that is spatially non-uniform wherein the anchoring energy increases radially outwards from the center of the liquid crystal optical device to the edges of the liquid crystal optical device or decreases radially outwards from the center of the liquid crystal optical device to the edges of the liquid crystal optical device; and varying magnitude of the at least one of the uniform electric field and the uniform magnetic field to modify the focal length corresponding to the positive or negative lens effect provided by the liquid crystal layer.

13. The method of claim 12, wherein the non-uniform spatial distribution of the anchoring energy is induced by a non-uniform rubbing applied to the at least one alignment layer.

14. The method of claim 12, wherein the at least one alignment layer includes a material with a photo-induced alignment property, and the non-uniform spatial distribution of the anchoring energy is induced by at least one of a non-uniform illumination, a non-uniform polarization, a non-uniform transmission and a non-uniform thickness of the at least one alignment layer.

15. The method of claim 14, wherein the non-uniform polarization includes exposing the at least one alignment layer through photo-masks and the photo-masks comprise liquid crystal cells producing a controllable modification of a polarization of a transmitted light.

16. The method of claim 15, wherein at least one of a light pattern of the non-uniform polarization and an intensity is formed by utilizing a mask including a liquid crystal spatial light modulator.

17. The method of claim 15, wherein at least one of the non-uniform polarization and an intensity is controlled at each point sequentially by utilizing a polarization modulator and a scanned light beam.

18. The method of claim 15, further including forming the non-uniform spatial distribution of the anchoring energy by utilizing two or more sequential exposures through gray-level masks, wherein each of the two or more sequential exposures has at least one of a type, an orientation, a state of polarization, and an intensity.

19. The method of claim 14, wherein the non-uniform illumination includes exposing the at least one alignment layer through photo-masks and the photo-masks comprise liquid crystal cells producing a controllable transmission of light.

20. The method of claim 12, wherein the at least one alignment layer comprises at least two different materials and wherein the non-uniform spatial distribution of the anchoring energy is induced by spatially varying the concentrations of the at least two different materials.

21. The method of claim 20, wherein the concentrations of the at least two different materials are varied in accordance with at least a screen printing process and a diffusion process.

* * * * *